United States Patent [19]

Fanning et al.

[11] 4,424,617
[45] Jan. 10, 1984

[54] METHOD AND APPARATUS FOR BOXING AND ENCAPSULATING ELECTRICAL DEVICES

[75] Inventors: William J. Fanning, Glen Ellyn; Peter J. Nichele, Chicago, Ill.; Roger P. Pratali, Berwyn, all of Ill.

[73] Assignee: Western Electric Company, Inc., New York, N.Y.

[21] Appl. No.: 284,833

[22] Filed: Jul. 20, 1981

[51] Int. Cl.³ .............................................. H01G 4/00
[52] U.S. Cl. ..................................... 29/25.42; 29/856; 264/272.18
[58] Field of Search ........................ 29/25.42, 854–856, 29/827; 264/272.15, 272.18; 361/306, 308

[56] References Cited

U.S. PATENT DOCUMENTS 4,268,942 5/1981 Meal et al. ........................ 29/25.42

Primary Examiner—Carl E. Hall
Attorney, Agent, or Firm—R. P. Miller; K. R. Bergum

[57] ABSTRACT

Plate-like carriers (51) having box-receiving slots (54) formed along one edge and rack teeth (58) formed along an opposite edge are fed from a stack (52) and along a trackway (53) where a pair of cog devices (59 and 61) are cyclically operated on fast and slow cycles to engage the rack teeth and move the carriers along the trackway. Boxes (30) are fed into each advanced carrier slot, whereafter the boxes are moved to an encapsulant dispensing station (63). During each slow cycle of operation of the cog devices a metered charge of encapsulant is dispensed into each pair of adjacent boxes. At a subsequent station (67) a strip (68) of lead-attached capacitors (36) are loaded into all the boxes in a carrier. The assembled boxes and capacitors are stripped from the carrier and moved through an encapsulant curing oven (80).

14 Claims, 19 Drawing Figures

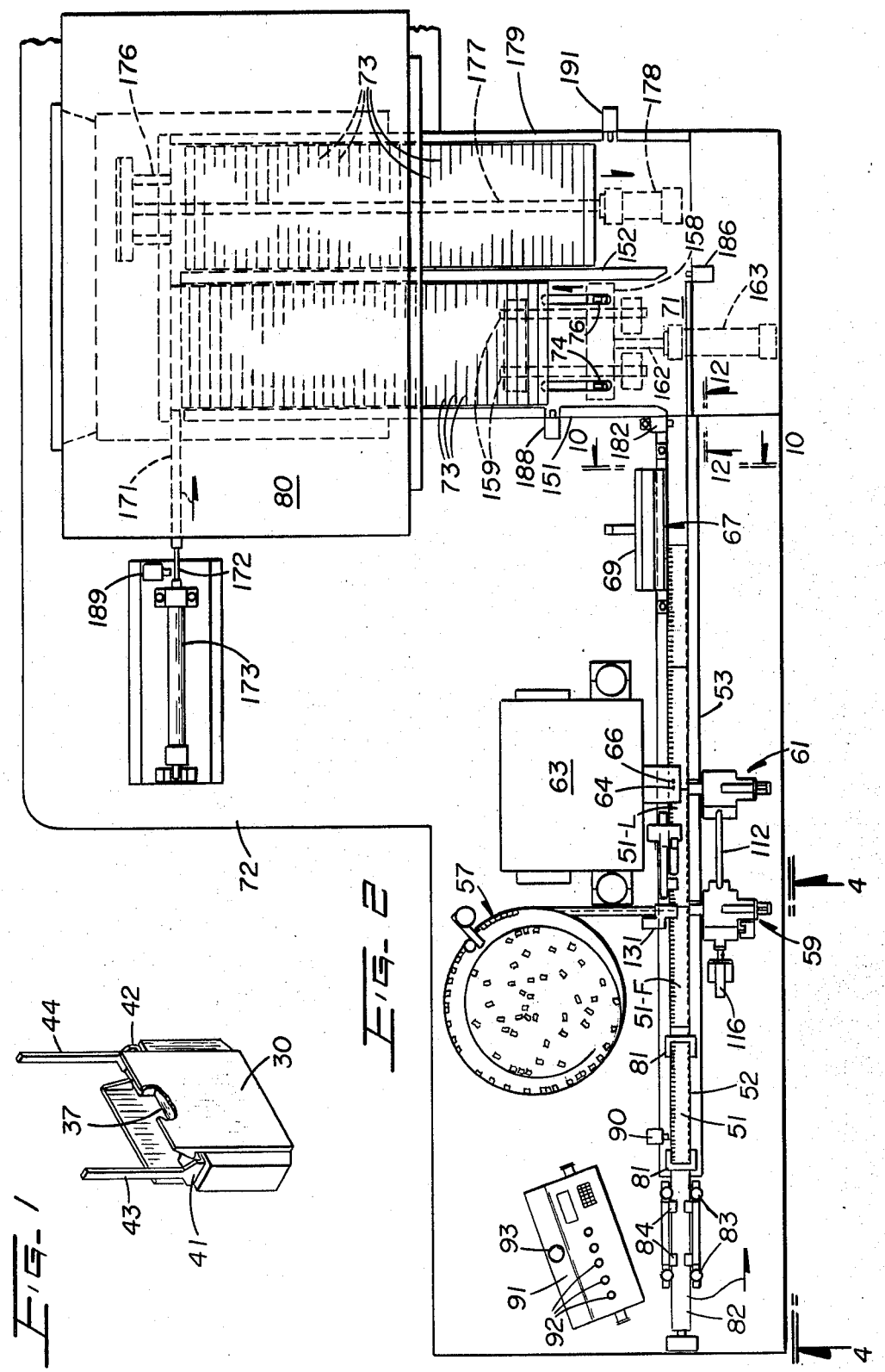

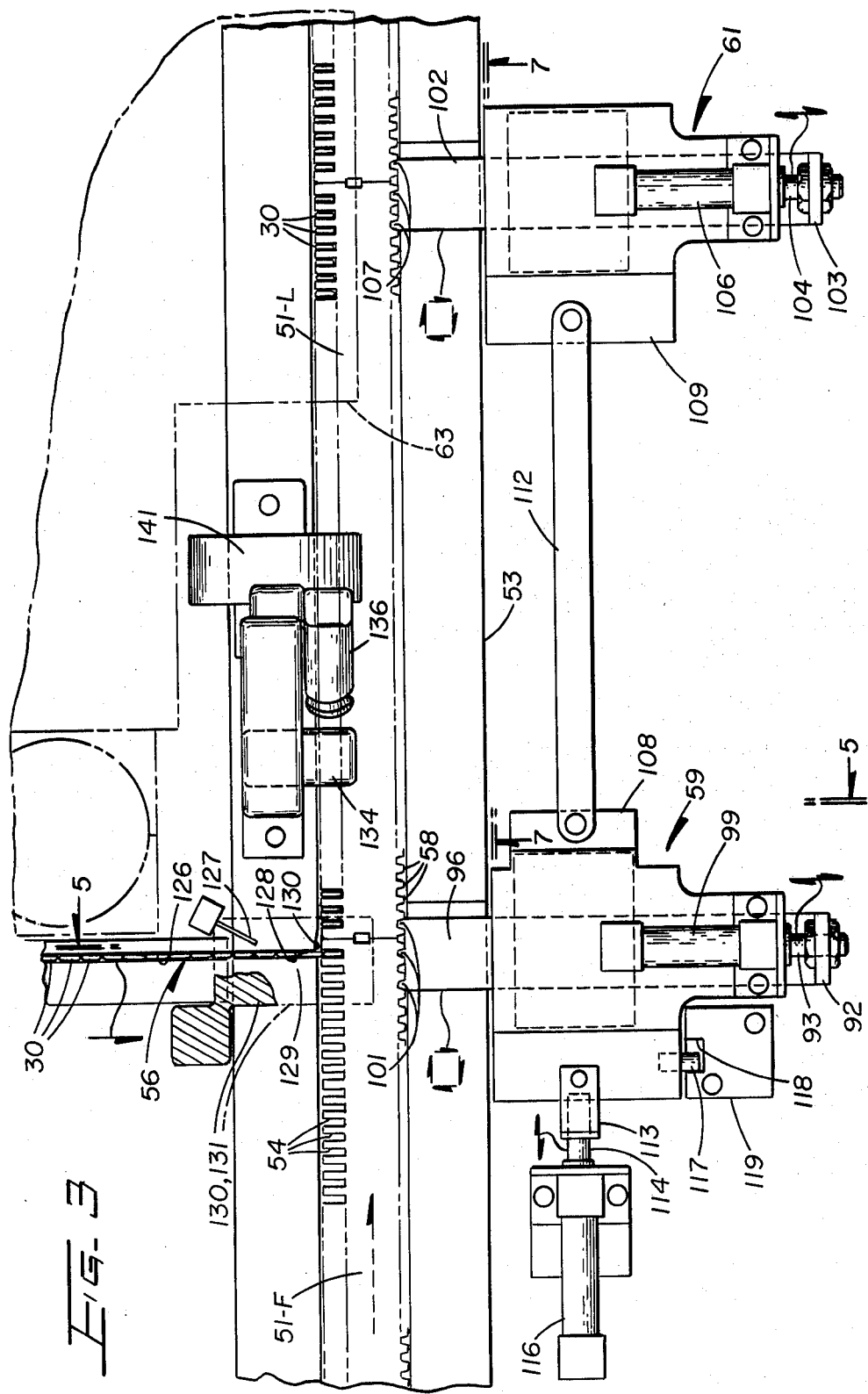

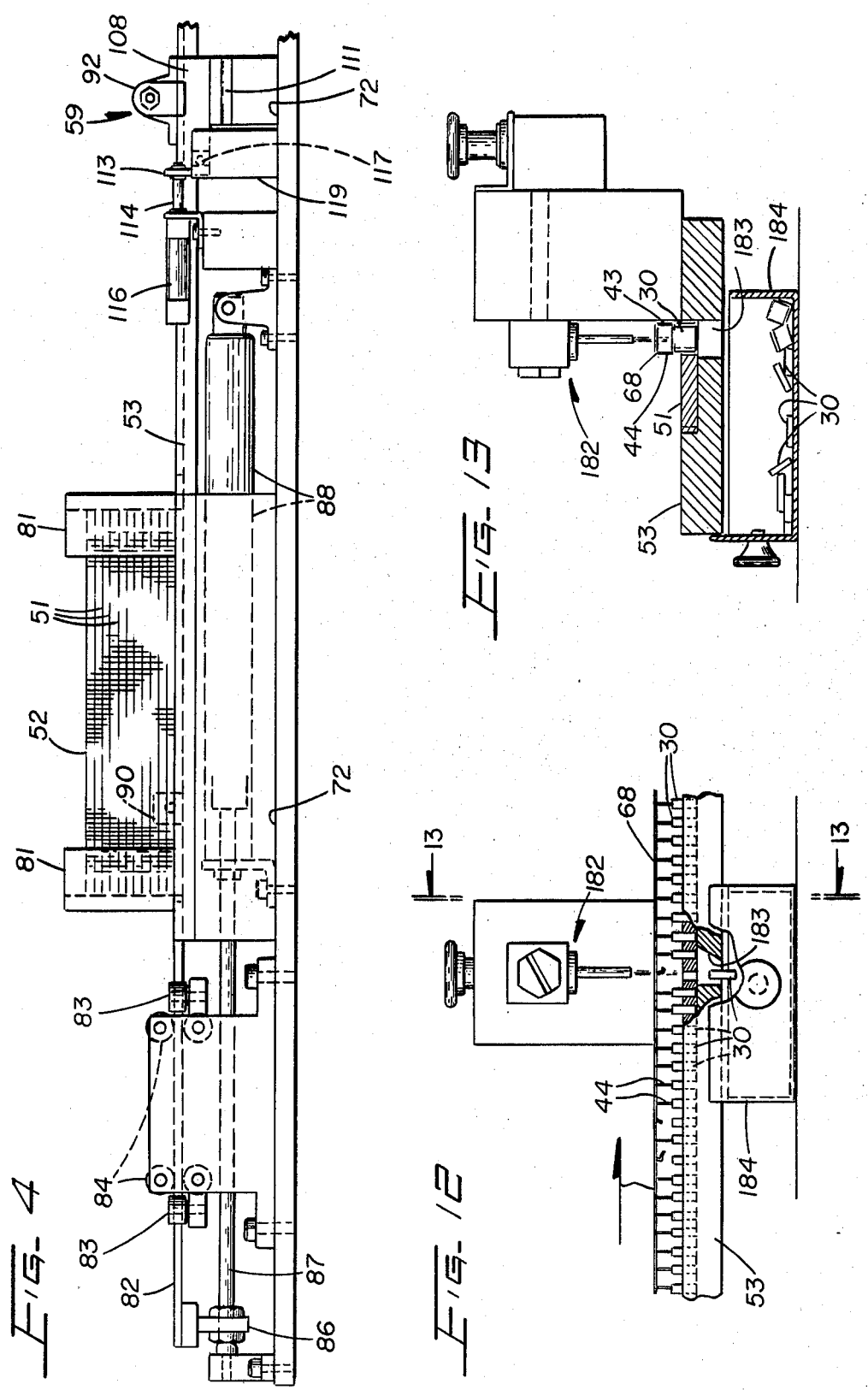

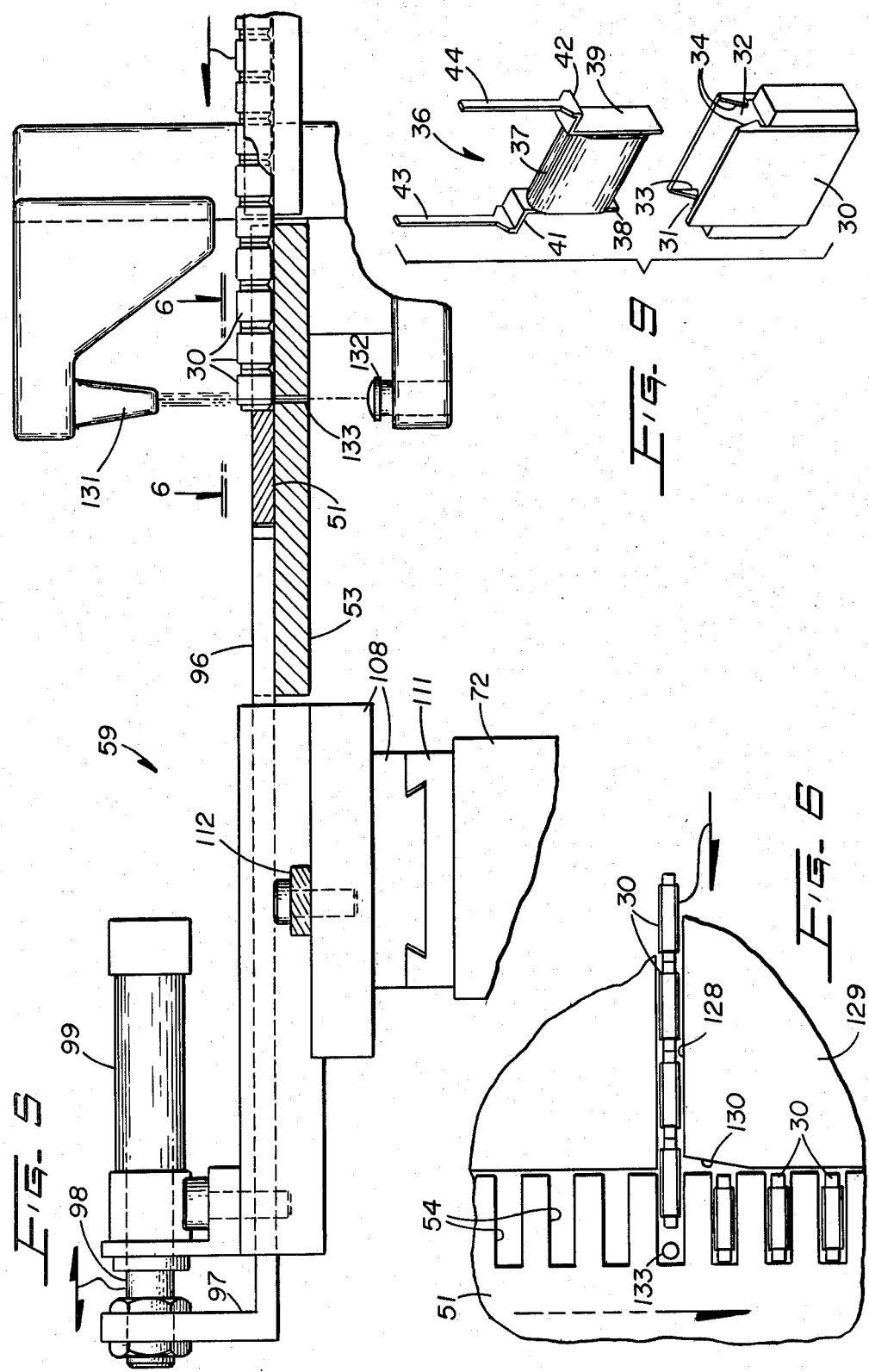

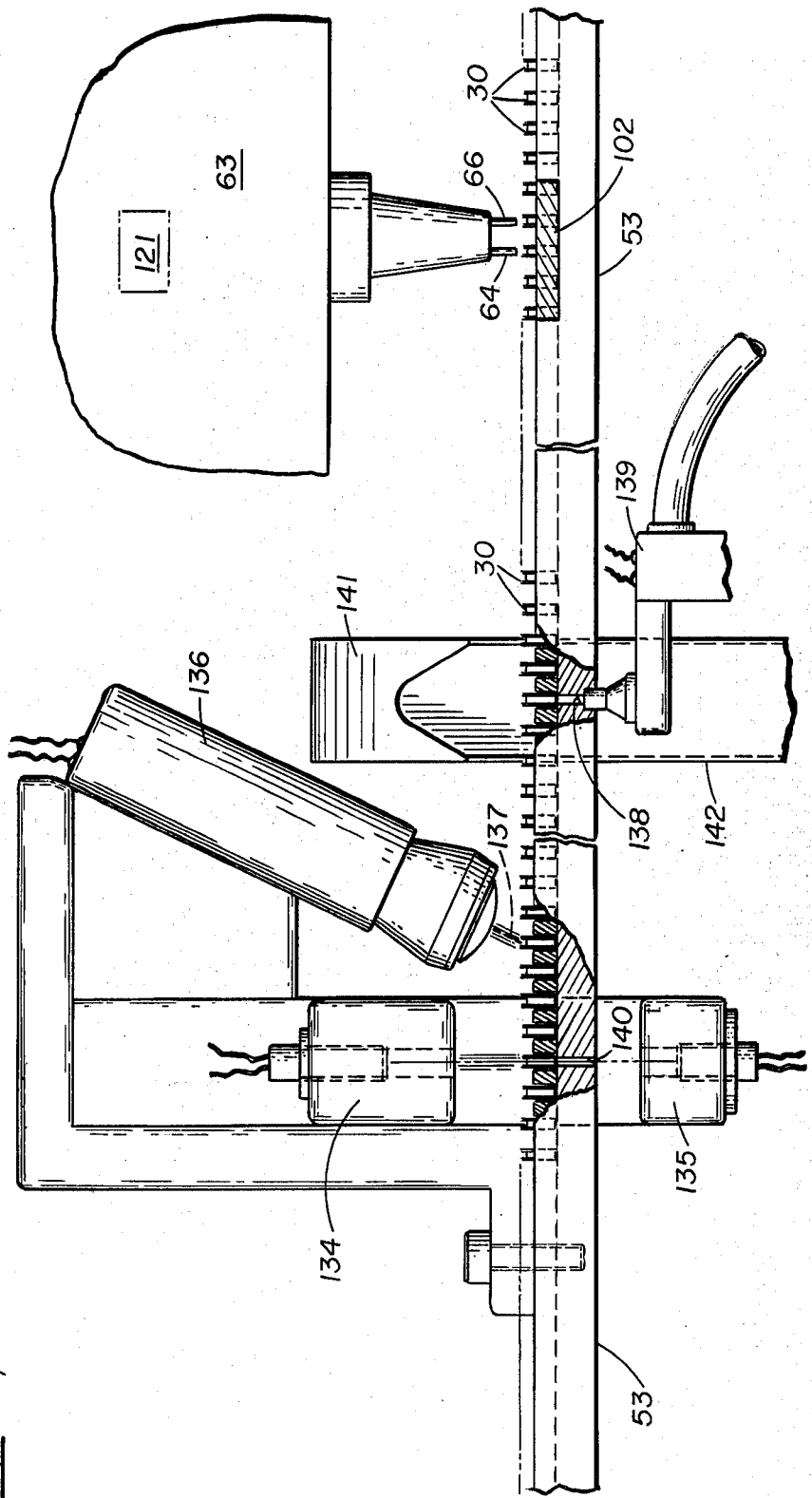

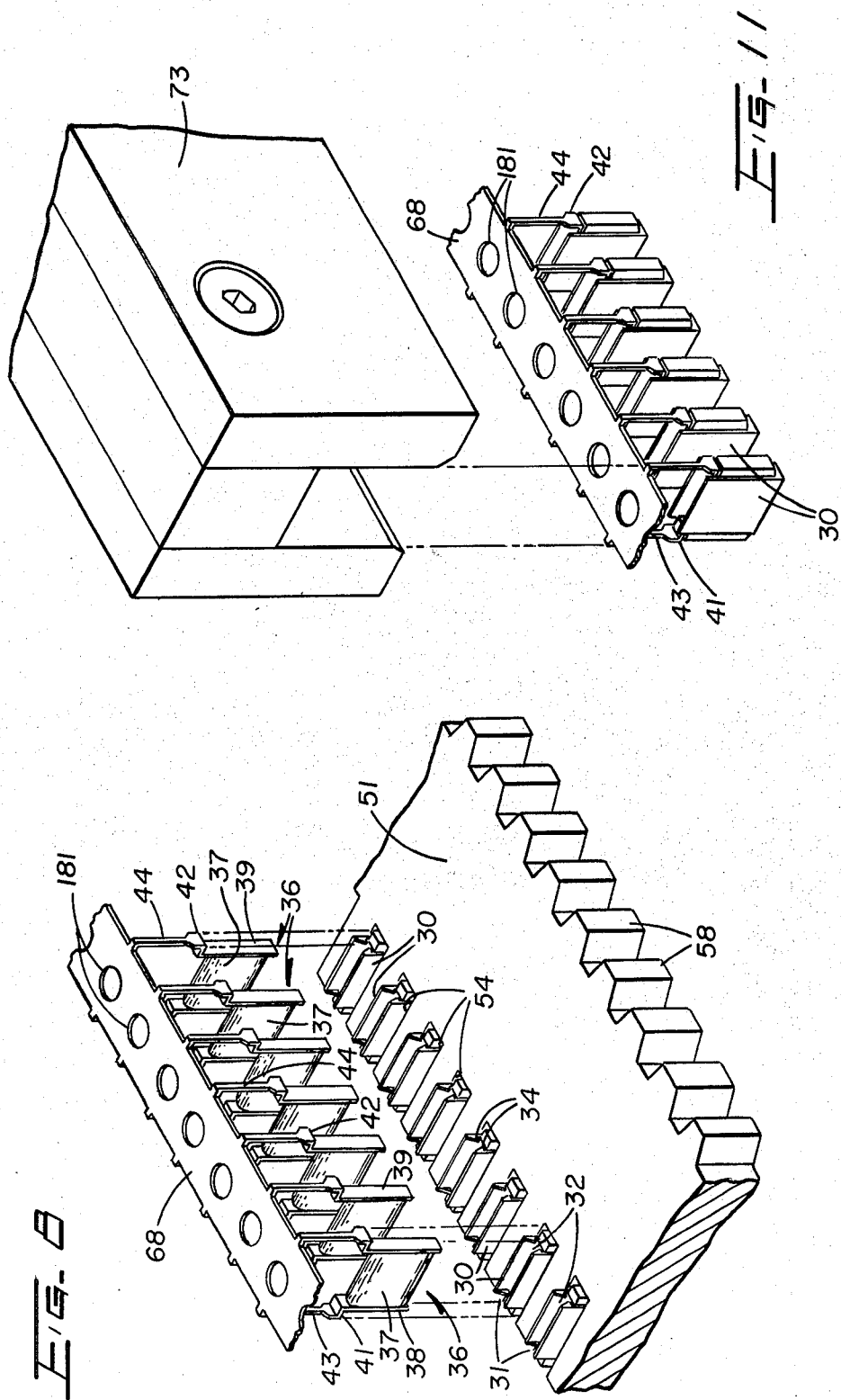

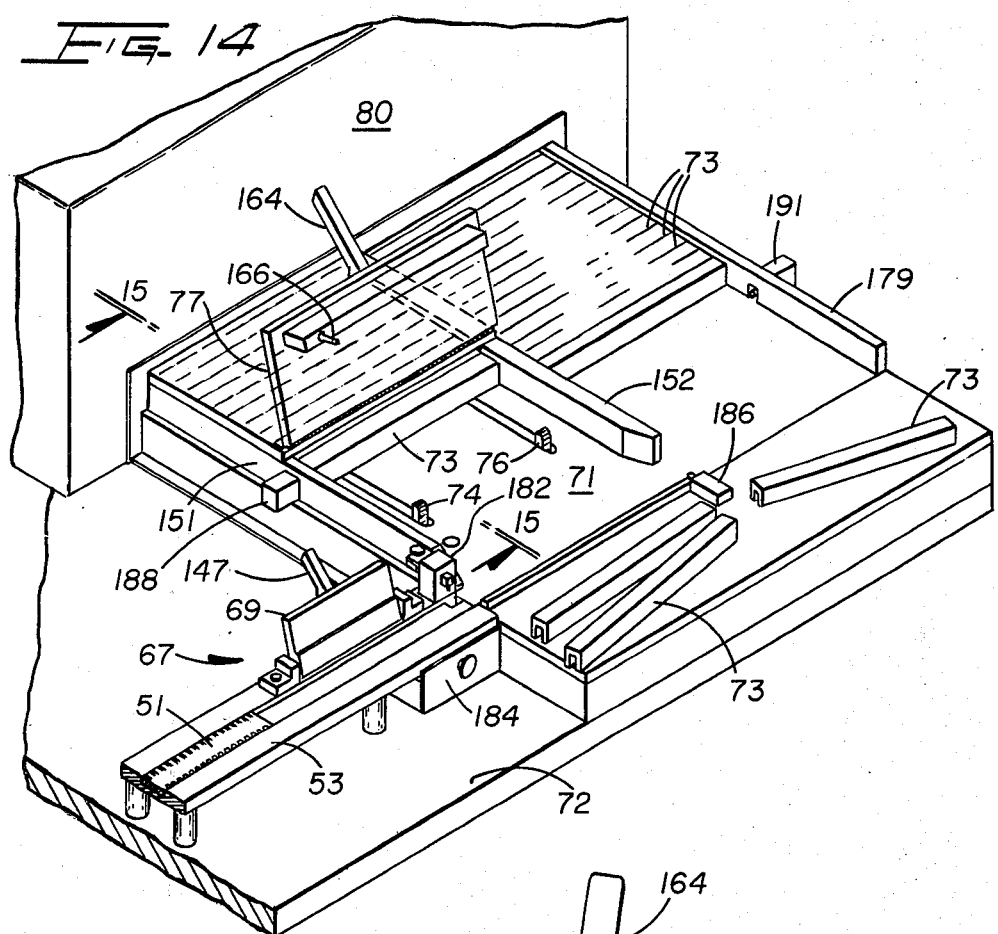
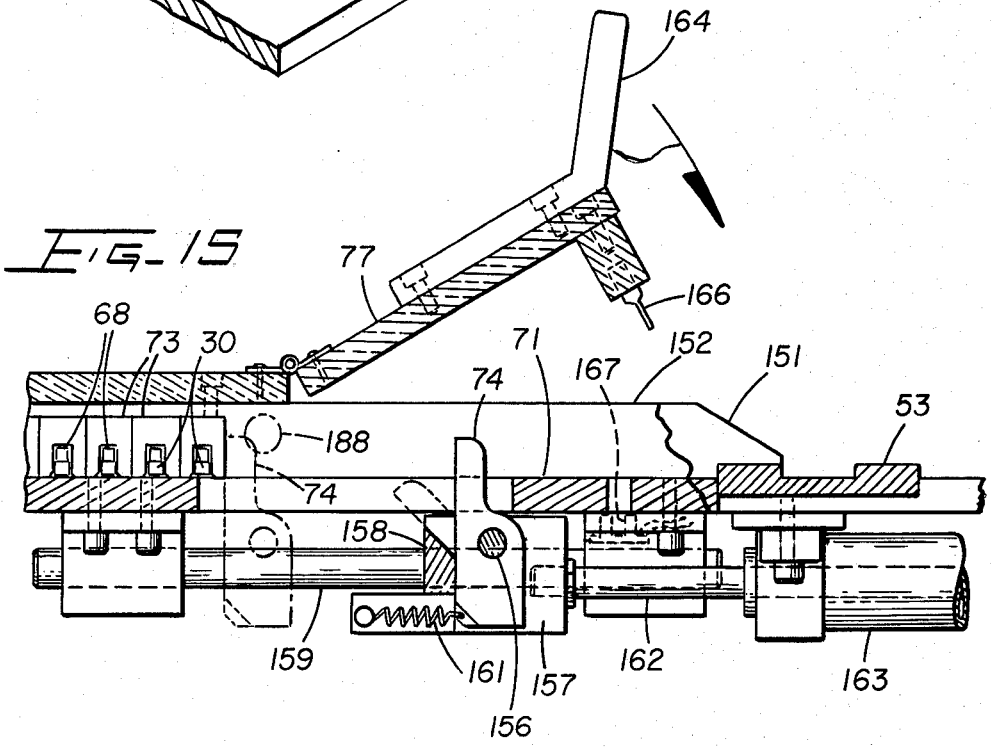

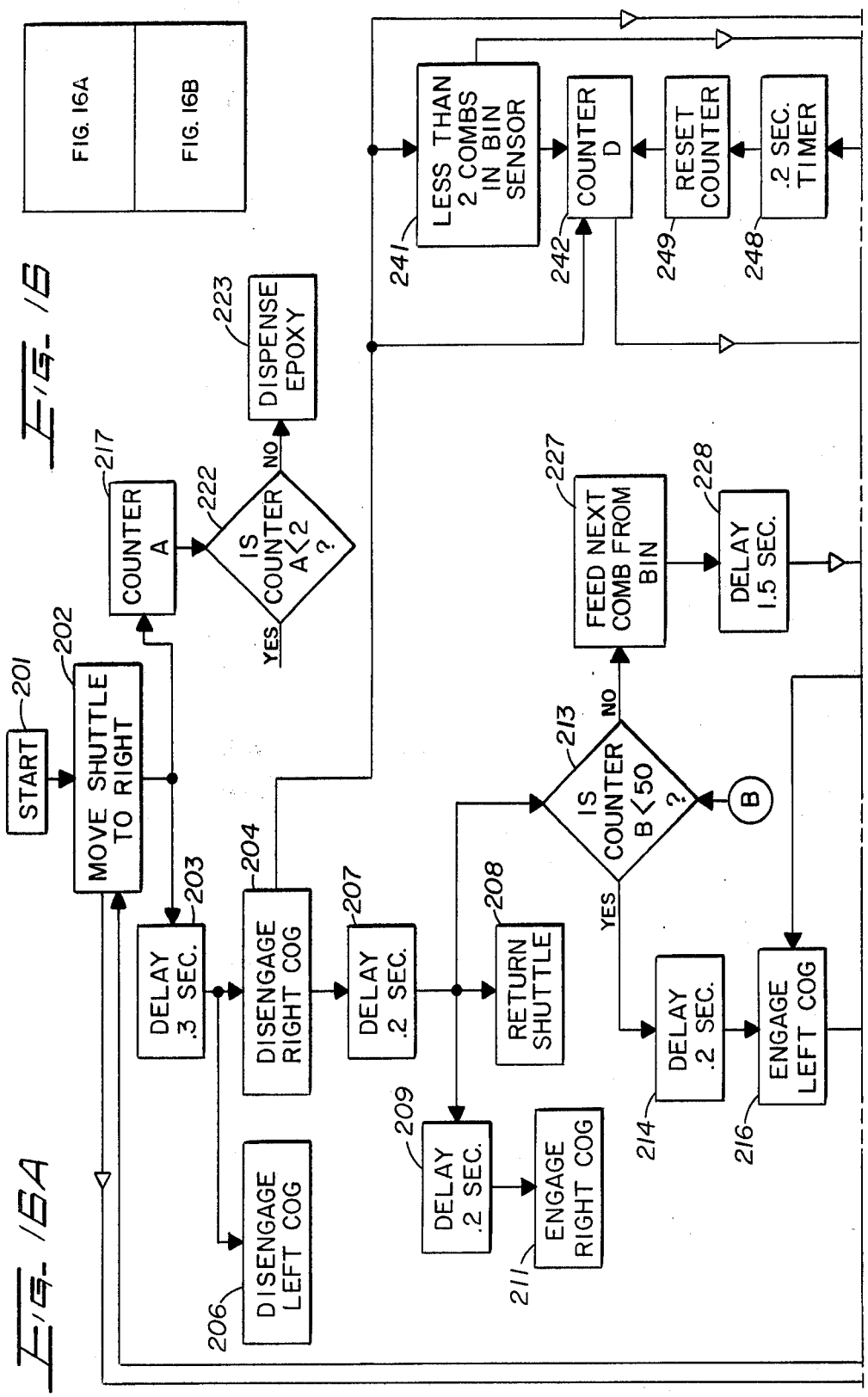

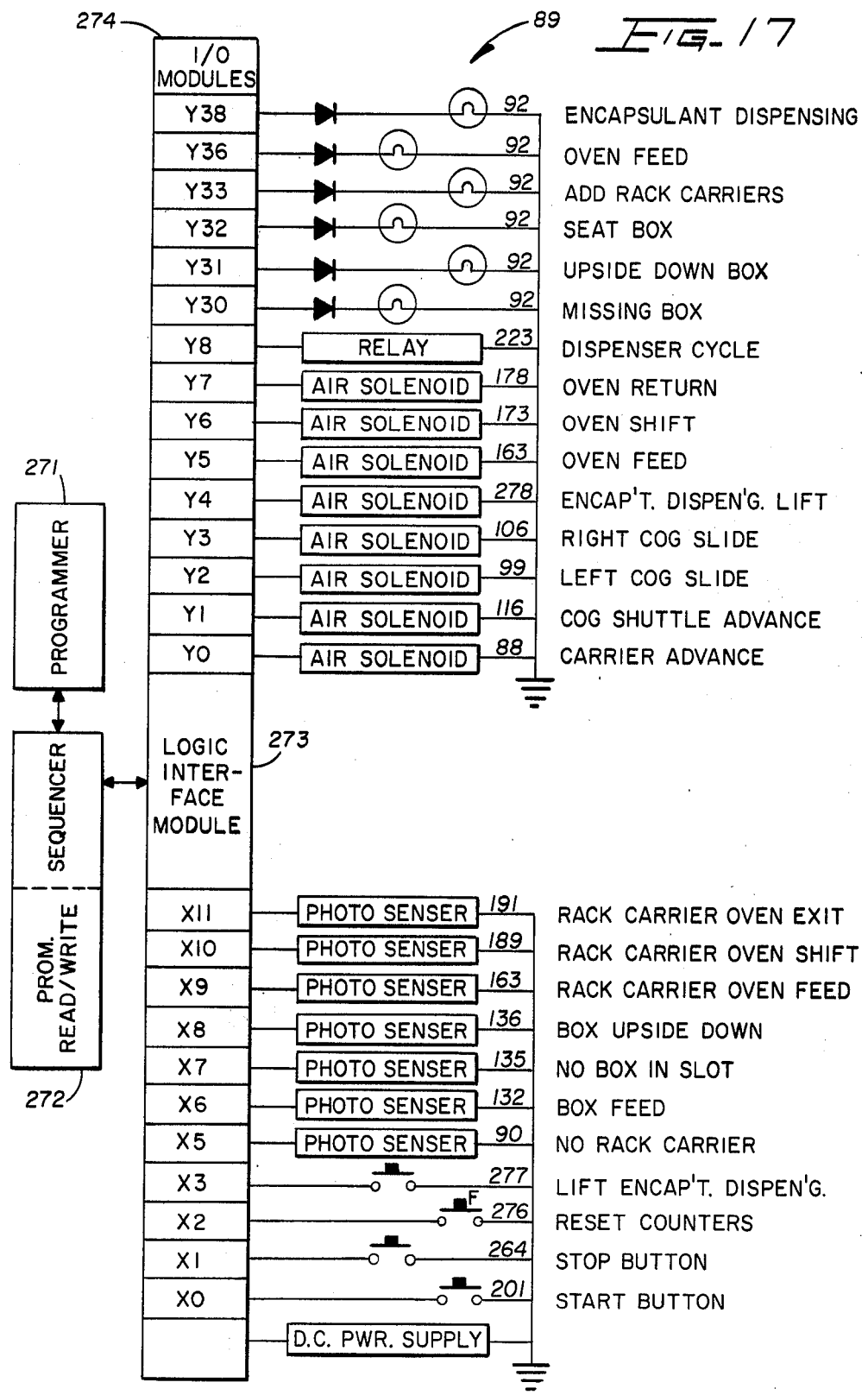

4,424,617

METHOD AND APPARATUS FOR BOXING AND ENCAPSULATING ELECTRICAL DEVICES

FIELD OF THE INVENTION

This invention relates to a method and apparatus for boxing and encapsulating electrical devices, such as small rolled metallized film capacitors and, more particularly, to a sequence of steps and an arrangement of fabricating facilities for feeding and partially filling pairs of boxes with encapsulant and then simultaneously assembling a number of capacitors in the boxes, whereafter the encapsulant is cured to produce boxed capacitors that may be machine inserted in printed wiring boards.

BACKGROUND OF THE INVENTION

In U.S. Pat. No. 4,268,942 issued May 26, 1981, to J. R. Meal et al., there is shown an apparatus for advancing a lead frame strip to a welding station where each pair of leads are bonded to a pair of end electrodes on a rolled metallized film capacitor of the type disclosed in W. J. Fanning et al. U.S. Pat. No. 4,240,127 issued Dec. 16, 1980. Small plastic boxes are partially filled with an encapsulant and pushed onto the capacitors, whereafter further advance of the lead frame strip moves the boxes seriatim past a dispenser which acts to fill each box with encapsulant. The assembled boxed capacitors are then loaded into a magazine for subsequent transport to an encapsulant curing oven. The boxed encapsulated capacitors are of a type that are susceptible to be machine inserted in a printed wiring board.

SUMMARY OF THE INVENTION

This invention contemplates, among other things, incrementally advancing with slow and fast cycles a series of carriers each loaded with a group of small boxes and dispensing an encapsulant into a pair of adjacent boxes during each slow carrier advance cycle, and then assembling capacitors attached to a lead frame strip into each group of boxes whereafter the boxed capacitors are stripped from each carrier and advanced through a curing oven.

More particularly, a carrier having a group of edge slots is removed from a stack by a stripper into a position to be engaged and advanced by a pair of cog devices. The cog devices are alternately operated to execute fast and slow cycles to incrementally advance the rack carriers. Small empty plastic boxes are fed into the carrier edge slots and facilities are provided to insure that each box is present and properly seated in each edge slot. Each fast and slow cyclic feed of the rack carrier moves a pair of boxes into alignment with a pair of encapsulant dispensing nozzles. Encapsulant is dispensed through the nozzles during a delay introduced into each slow feed cycle and partially fills the aligned adjacent pair of boxes. Subsequent advance of the carrier moves each group of boxes into a station where an attending operator assembles a group of capacitors extending from a finite section of lead frame strip into the boxes. Each capacitor is formed with a pair of terminals having a predetermined width. The strip is loaded so that shoulder sections of the terminals are snapped through necked-down slots formed in opposite side walls of each box. The assembled capacitors and boxes are stripped as a group from the carrier and then fed through a curing oven to set the encapsulant.

BRIEF DESCRIPTION OF THE DRAWINGS

Other features and advantages of the invention will be apparent upon consideration of the detailed description when considered in conjunction with the drawings, wherein:

FIG. 1 is a perspective view of a capacitor boxed and encapsulated by the apparatus and methods illustrated in the other figures;

FIG. 2 is a plan view of the overall apparatus showing the facilities for and illustrating the steps of assembling and encapsulating small electrical devices, such as rolled film capacitors, within boxes in accordance with the principles of the invention;

FIG. 3 is an enlarged plan view of a pair of cogs that are cyclically operated to feed rack carriers past a box loading facility;

FIG. 4 is a side elevational view taken along line 4—4 of FIG. 2 showing a mechanism for feeding a succession of rack carriers onto a trackway running through a number of assembling and processing stations;

FIG. 5 is a side view partially in section taken along line 5—5 of FIG. 3 showing the feed of empty boxes into a rack carrier and a shuttle for moving the cogs to advance the rack carriers;

FIG. 6 is a top view taken along line 6—6 of FIG. 5 showing the boxes being fed into seating slots formed in a rack carrier;

FIG. 7 is a side elevational view depicting facilities for sensing the presence and orientation of the boxes fed into the rack carriers together with a dispenser for metering charges of an encapsulant into a pair of adjacent boxes;

FIG. 8 is a perspective view depicting the loading of a group of capacitors depending from a section of lead frame strip into an aligned group of boxes seated within a rack carrier;

FIG. 9 is a perspective view illustrating the mode of assembling a capacitor with attached terminal leads into a box;

FIG. 11 is a perspective view showing the capacitors seated and locked in the boxes in conjunction with a tool for stripping a group of boxed capacitors from a rack carrier;

FIG. 12 is a front view taken along line 12—12 of FIG. 2 showing a blower device for ejecting boxes from the rack carrier whenever a box is not secured to a pair of leads extending from a capacitor;

FIG. 13 is a cross-sectional view taken along line 13—13 in FIG. 12 showing the blower device and a receptacle for receiving non-lead frame connected boxes;

FIG. 14 is a perspective view illustrating a portion of an oven into which the boxed encapsulated capacitors are advanced in groups to cure the encapsulant;

FIG. 15 is a sectional view taken along line 15—15 of FIG. 14 showing a safety cover for controlling a feed mechanism to advance groups of boxed capacitors into the oven;

FIG. 17 is a block diagram illustrative of a programmed sequence controller that may be utilized to effectuate the necessary sequential control of the component mechanisms making up the overall apparatus.

DETAILED DESCRIPTION

Figure 10:
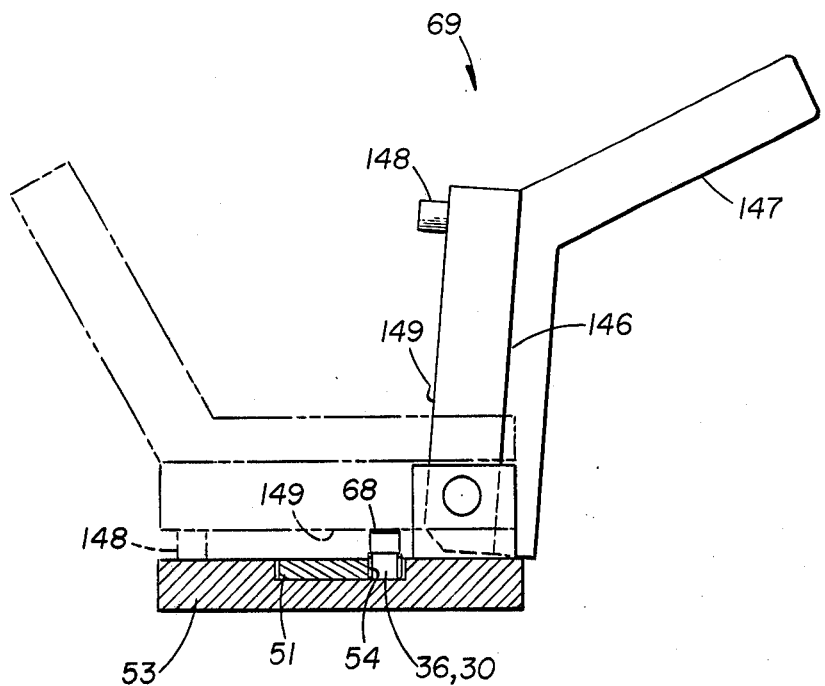
FIG. 10 is a side elevational view of a tool for positively seating a group of capacitors within boxes positioned in a rack carrier.

Referring to FIGS. 1 and 9, there is shown a small plastic box 30 having a pair of opposed wall slots 31 and 32 with necked-down entries 33 and 34 and an electrical device 36, such as a rolled metallized film capacitor of the type disclosed in the afore-identified patent to W. J. Fanning et al. The capacitor 36 consists of a rolled metallized film capacitor blank 37 solder attached to a pair of terminals or leads 38 and 39 having shoulder sections 41 and 42 of predetermined widths running to terminal or lead insert sections 43 and 44. The widths of the shoulders are selected to be slightly greater than the widths of the entries 33 and 34 so that when the capacitor 36 is assembled into the box 30, the shoulders will snap through the entries to lock the capacitor within the box. The apparatus shown in the other views illustrates an array of facilities that may be utilized to assemble groups of capacitors into groups of boxes to produce boxed encapsulated capacitors of a type that may be subsequently machine inserted in a printed circuit board or bonded to circuit pads formed on a suitable substrate.

In general, referring to FIGS. 2, 3 and 4, rack carriers or combs 51 are fed from a bottom of a stack 52 along a trackway 53 to present successive edge slots 54 to a train 56 of boxes 30 emanating from a commercial vibratory feeder 57. Each rack carrier, see FIGS. 2, 3 and 8, is formed with a set of feed teeth 58 that are cyclically engaged by a pair of cog devices 59 and 61 coupled together to provide a shuttle to cyclically move each rack carrier along the trackway 53. The timing of the operation of the cog devices is controlled so that the devices alternately execute a fast cycle and a slow cycle to advance the boxes in equal increments. When the rack carrier is loaded with properly oriented boxes, and is incrementally advanced through a fast and a slow cycle, each successive pair of boxes moves to an encapsulant dispensing station 63 in alignment with a pair of nozzles 64 and 66, see FIG. 7. During a delay in the slow rack feed cycle, the dispenser 63 is automatically operated to meter charges of a heat curable encapsulant into the aligned pair of boxes 30 to partially fill the boxes.

Next, referring to FIG. 8, the carrier rack 51 filled with boxes 30 is advanced to an assembly station 67, see FIGS. 2 and 14 where an attending operator positions a section of lead frame strip 68 over the boxes 30 that are partially filled with encapsulant. The lead frame strip is connected to the pairs of terminal sections 43 and 44 of the leads 38 and 39 that are solder attached to the capacitor bodies 37. The spacing of the capacitors on the lead frame strip is equal to the spacing between the boxes 30 loaded in the rack carrier 51. A length of lead frame strip is cut to provide a number of attached capacitors which are equal to the number of boxes loaded in an aligned rack carrier 51. The attending operator manipulates the lead frame strip to position a capacitor in each of the boxes. Now the attending operator actuates a pressing tool 69, see FIGS. 2 and 10, to force the lead frame strip downwardly to snap the shoulders 41 and 42 of the leads through the necked-down entryways 33 and 34 to seat the capacitors in the boxes.

The rack carrier is moved from the trackway 53 onto a platform 71, see FIG. 14, mounted on a base plate 72 for supporting the overall apparatus. The attending operator picks up a U-shaped stripper channel bar 73 and places the bar opening over the lead frame strip 68 projecting from the rack carrier 51 to center the lead frame strip with respect to the widths of the boxes, and then moves the bar laterally of the rack carrier to strip the boxes of capacitors from the carrier. The stripper bar loaded with the section of lead frame strip and boxed capacitors is moved in front of a pair of feed dogs 74 and 76. A safety cover 77 is closed and the dogs are slid fowardly to move the loaded channel bar into and through an oven 80 to cure the encapsulant.

Considering the component mechanisms in detail, attention is first directed to the facilities for advancing the rack carriers 51, see FIGS. 2 and 4, from the stack 52 onto the trackway 53. The stack of carriers is confined within a bin 81 having front and rear openings to permit the movement of a slide 82 that peels off the lowermost rack carrier and advances it into a position to be incrementally indexed by the cog devices 59 and 61. The slide 82 rides between horizontal bearing rollers 83 and vertical bearing rollers 84 and is attached by a coupling 86 to a piston rod 87 extending into an air cylinder 88.

Air cylinder 88 is controlled by a solenoid valve which is selectively energized by a cyclically operated control circuit or a programmed controller 89, see FIG. 17. In particular, the controller schematically illustrated is a commercial system known as the 5TI Programmable Controller System which is sold by Texas Instruments Incorporated of Adelboro, Massachusetts. The solenoid controlled valves, associated with each of the air cylinders, are commercial valves of a type that are operated upon energization of the solenoid to admit air to the rod or front end of the cylinder. When the solenoid is deenergized, the valve is switched so that air is admitted to the other or rear end of the cylinder. Energization of the solenoid associated with the air cylinder 88 is effective to withdraw the piston rod 87 to move the slide toward the right to advance the lowermost rack carrier from the stack and position the leading edge of the carrier against a trailing end of a carrier that is aligned with the cog devices 59 and 61.

The height of the stack 52 of rack carriers is monitored by a photodetector 90. When the stack is substantially depleted so that only two rack carriers are in the stack, the photodetector generates a signal which is impressed on the controller 89. The controller counts twenty additional operations of the cog devices 59 and 61, and if the stack 52 is not replenished illuminates a light on a display panel 91 for the controller 89 and then generates a signal which is effective to halt further operation of the overall apparatus. The panel 91 has a number of lights 92 to indicate the functioning and malfunctioning of the various components mechanisms. A buzzer 93 is also provided to apprise the operator of certain conditions such as the approaching depletion of rack carriers in the bin 81. The attending operator is apprised by the illumination of the light on the display that the stack is approaching depletion and normally makes a replacement of rack carriers before the apparatus is halted.

Each rack carrier or comb 51 is provided with an even number of box receiving edge slots 54, e.g., fifty slots, that are evenly spaced along a side edge of the carrier. The first and last slots are spaced a distance from the front and rear ends of the carrier which is equal to the distance between an adjacent pair of slots.

Each carrier is also fabricated with a set of rack teeth 58 formed along the opposite edge. The spaces between the rack teeth are equal in number to and aligned with the slots 54. The rack teeth are formed along the entire length of the carrier with half a tooth slot formed at both leading and trailing ends of the rack carrier. More specifically, when a pair of rack carriers are abutted, such as disclosed in FIG. 3, there is a full tooth slot provided by the junctures of the rack carriers so that the rack teeth run the entire length of each rack carrier.

The cyclic operations of the cog devices 59 and 61 are counted by signals generated within the controller 89, and when fifty advances are registered the air cylinder 88 is operated to move the slide 82 toward the right to advance the lowermost rack carrier into juxtaposition with the trailing rack carrier 51-L being positively advanced along the trackway by the cog devices 59 and 61. The operation of the slide 82 is controlled to occur while the left-hand cog device 59 is in a withdrawn, non-feeding position and the right-hand cog device 61 is in a forward position to engage rack teeth formed on two abutting carriers and thus hold these carriers from unintended advancement upon engagement of the new rack carrier 51-F with the end of the rack carrier 51-L.

The cog device 59 includes a slide 96, see FIGS. 3 and 5, having an upright section 97 connected to a piston rod 98 extending into an air cylinder 99. Normally, the air cylinder 99 is cyclically operated under the control of a solenoid valve so that when the associated solenoid is energized by the controller 89, the piston rod 98 is thrust from the air cylinder and the slide 96 is drawn away from the rack carrier.

The forward end of the slide 96 is provided with a set of three teeth 101. The teeth 101 are spaced apart a distance equal to twice the spacing between the teeth 58 on the rack carriers. In effect, there are two missing teeth which permit the slide 96 to move toward the rack carrier and engage a rack tooth on a leading carrier 51-L and a pair of rack teeth on a following carrier 51-F. Cog device 61 is similarly constructed with a slide 102, an upright section 103, a piston rod 104, an air cylinder 106 and a set of teeth 107, two of which appear to be missing to permit the right and left-hand teeth to straddle the tooth slot presented by the aligned, abutting leading and following ends of the rack carriers.

Cog devices 59 and 61 are mounted on a pair of dovetailed slide plates 108 and 109 (see FIGS. 3 and 5) that, in turn, are fitted within dovetailed ways formed in blocks 111 secured to the apparatus housing 72. A strap bar 112 interconnects the cog devices to permit the cog devices to move in unison as a shuttle to incrementally advance the rack carriers. The cog device 59 is provided with a bracket 113 that is secured to a piston rod 114 which extends from an air cylinder 116. Air cylinder 116 is cyclically operated by a solenoid valve which is controlled by the sequence controller 89. When this solenoid valve is energized, the piston rod 114 is thrust toward the right to advance the cog devices 59 and 61 to feed the engaged rack carriers one increment along the trackway 53. The increment of advance is limited by a pin 117 that rides within a slot 118 formed in a plate 119 attached to the housing. The stroke of the piston 114 is such that the engaged rack carriers are incrementally advanced a distance equal to the distance between a pair of adjacent rack teeth 58.

The controller 89 applies signals that operate the cog feed devices 59 and 61 on fast and slow cycles. This is accomplished by controlling the timing of the operation of the solenoid valve associated with the air cylinder 116. More specifically, in a normal feed cycle the solenoid valves for the air cylinder 99 and 106 are simultaneously operated to withdraw both of the toothed slides 96 and 102. Next, the solenoid valve for the air cylinder 116 is deenergized, reversing the air applied to the cylinder thus withdrawing the piston rod 114 and the tied together slide blocks 108 and 109 toward the left. Shortly thereafter, the solenoid valves associated with the air cylinders 99 and 106 are deenergized, reversing the air applied to the air cylinders 99 and 106 thus causing the slides 96 and 102 to move the toothed ends thereof to engage the aligned carrier rack teeth 58. The solenoid valve associated with the air cylinder 116 is thereafter reversed so that the piston rod 114 is thrust toward the right to move both cog devices toward the right. By controlling the timing of the initiation of the operation of the air cylinder 116 to thrust the shuttle toward the right to advance the rack carriers, the shuttle can be controlled to execute either a fast or slow cycle.

The encapsulant mixer and dispenser 63 is of commercial manufacture and is constructed so that the nozzles 64 and 66 are positioned adjacent to each pair of advanced boxes. The encapsulant mixer and dispenser 63 illustrated in the drawing is a modification of a commercial dispenser, such as PORTIONATOR III sold by Glenmarc Manufacturing, Inc., Northbrook, Illinois. It is constructed and positioned so that each successive pair of boxes advanced by the cog devices moves into alignment with the pair of nozzles. Following each fast cycle of the cog devices 59 and 61, a relay circuit 121 is energized to automatically control the dispensing of metered amounts of encapsulant through the nozzles into the aligned boxes.

The periods of the fast and slow cycles of operation of the cog feed devices 59 and 61 is set by timing the operation of the solenoid valve associated with the air cylinder 116. During the slow cycle, the operation of the air cylinder 116 is delayed for a sufficient amount of time to allow the dispenser 63 to complete the injection of encapsulant into the aligned boxes.

When the cog devices 59 and 61 are operated to initiate the advance of a new rack carrier 51-F, the controller 89 causes the cog devices to execute two fast cycles in succession because at this time non-slotted abutting ends of two rack carriers are positioned beneath the nozzle 64 (see FIG. 2). As previously mentioned, when a new rack carrier, such as carrier 51-F, is advanced by slide 82 to engage the trailing end of the rack carrier 51-L, the slide 102 is in the forward position so that the teeth 107 engage the rack teeth on the carrier 51-L. This carrier is held from movement by the advancing new rack carrier 51-F. After a delay sufficient to feed the new rack carrier 51-F, the cog slide 96 is moved forward so that the teeth 101 engage teeth on both the rack carriers 51-F and 51-L.

The timing of the operation of the air cylinder 116 is controlled to execute two fast cycles so that the non-slotted areas of the abutting rack carriers are moved from beneath the nozzle 64. The second fast cycle moves the non-slotted portions of the abutting rack carriers from beneath the nozzles 66. During the fast cyclic operation of cog devices 59 and 61 to pick up and advance the new rack carrier, the encapsulant dispenser is held from operation. The next cycle of the feed device is on a slow basis thus enabling the dispenser to execute a cycle of operation and dispense encapsulant into the first two aligned boxes in the new rack carrier positioned beneath the nozzles 64 and 66. The cog devices 59 and 61 are then successively operated on fast and slow cycles and encapsulant is dispensed into each pair of advanced boxes during each slow cycle.

Returning now to a consideration of the feeding of the boxes 30 into the slots 54 formed in a rack carrier 51, and referring to FIGS. 3 and 6 the boxes are successively advanced as a train along a trackway 126. The vibratory feed is abetted by an air jet 127 which assists the movement of the boxes through a guideway 128 formed in a guide block 129 into an aligned slot 54. It will be noted that the exit of the guideway runs into a bevel surface 130 (FIG. 6) which functions to cam and fully seat any box that is not fully seated in a slot upon subsequent advance of the rack carrier.

Referring to FIG. 5, there is shown a photodetector comprising a light source 131 and a light detector 132. The light from source 131 is projected onto the edge of the rack carrier and passes onto a box 30 positioned in the slot. If the box is missing or partially seated within the slot, then the light passes through a hole 13e to impinge onto the detector which, after a delay sufficient to allow for the normal seating of a box, generates a signal which is utilized to interrupt operation of the overall apparatus. If a box is not fully seated to block the hole 133, then a subsequent advance of the rack carrier would shear the partially seated box. If the light detector 131 ascertains light indicating a missing box, or a box that is not substantially seated in the slot to block the hole 133, a signal is generated to halt the apparatus and illuminate a light 92 on the panel 91 to apprise the operator of the situation, e.g., a jam in the feed of the boxes by the vibratory feeder, an exhaustion of boxes or a partially seated box which does not block the light from source 131.

As the rack carrier advances, each slot 54 with a box is presented to a second photodetector, see FIG. 7, comprising a light source 134 and a light detector 135. If a box is missing, light is passed through a slot 140 formed in the trackway 53. Actually, the missing box signal is impressed in a shift register and after seventeen subsequent advances of the rack carrier and shifts of the signal in register, the photodetector signal is effective to stop the operation of the overall apparatus to permit the attending operator to place a box in the empty slot. This delay in operation of the rack carrier feed is provided to permit the advance of the empty rack carrier slot into a position clear of any obstructions presented by the other parts of the apparatus, thus allowing the attending operator to observe and insert a box into the empty slot. The cyclic operation of the apparatus can then be recommenced. The use of two photodetectors 131–132 and 134–135 insures that no empty rack carrier slots are presented to the encapsulant dispenser so that there is no chance of encapsulant being dispensed onto the trackway 53.

On occasion a box passes from the vibratory feeder in an upside down orientation. The box passes a photodetector device 136 which impinges a light beam 137 on the top of the boxes. If the open end of the box is presented to the light beam there is a minimum amount of reflected light. If, however, the bottom side of the box is presented to the light beam, there is a significant amount of reflection which is picked up by a section of the photodetector 136 to generate a signal which is impressed on a shift register. During each subsequent cyclic advance of the rack carrier, the registered signal is shifted and upon fourteen shifts, the upside down box is positioned adjacent to an air nozzle 138. The shifted signal is effective to operate a valve 139 which applies an air pulse to the upside down box. The box is ejected and hits a curved plate 141 which guides the ejected box into a discharge chute 142. At this time the cyclic feed is interrupted and a suitable indicator light illuminated on the display 91. The attending operator places a properly oriented box in the now vacated slot in the rack carrier. The apparatus is restarted by the operator.

Each rack carrier is subsequently advanced to the capacitor loading station 67. At station 67 the attending operator shifts the leading rack carrier toward the right into a position adjacent to the pressing tool 69. A section of lead frame strip 68 with fifty depending capacitors 36 is positioned over the boxes and the capacitors are partially inserted in the boxes. The pressing tool as shown in FIG. 10 comprises a lever 146, a handle 147 and stop 148 together with a press surface 149. The handle is grasped to pivot the lever 146 and moves the surface 149 into pressing engagement with the top of the lead frame strip 68. The shoulders 41 and 42 of the capacitor terminals are snapped through the necked-down entries 33 and 34 formed in the boxes 30. The stop 148 limits the movement of the lever 146 to insure that excessive force is not applied to crush the capacitor terminal leads.

The attending operator shifts the assembled carrier rack with the assembled capacitors and boxes into alignment with a pair of guide rails 151 and 152 (see FIGS. 2 and 14) leading into the oven 80. A U-shaped stripper channel bar 73 is placed over the lead frame 68 projecting from the rack carrier and is slid transversely of the rack carrier to strip the boxes 30. The channel bar 73 containing the assembled capacitors and boxes is slid between the guide rails 151 and 152 over the pair of spring-loaded dogs 74 and 76. As shown in FIGS. 2 and 15, dog 74 and dog 76 are mounted by stud pins 156 in slots 157 formed in a slide block 158 mounted on guide rods 159. A spring 161 urges the lower portion of the dog 74 against a forward wall of the slot 157. A similar structure and mounting are provided for dog 76. The block 158 is connected to a piston rod 162 extending from a solenoid controlled air cylinder 163.

Following movement of a channel bar past the spring-loaded dog 74, the safety lid 77 is lowered by grasping a handle 164. The lid 77 has a projecting shutter 166 which is moved into a photosensor 167. Upon sensing the shutter 166, the photosensor sends a signal to the controller 89 which, after a short delay, operates the solenoid valve associated with the air cylinder 163 to cause the air cylinder to move the piston rod 162 toward the left. The block 158 and the dogs 74 and 76 are moved to the left to move the channel bar 73 into the oven 80.

The channel bars are successively moved into register with a pusher 171 connected to a piston rod 172 emanating from an air cylinder 173. Air cylinder 173 is controlled by a solenoid valve which, in turn, is cyclically operated by the controller 89. Each channel bar 73 is shifted into alignment with a puller 176 which is connected to a piston rod 177 which extends into an air cylinder 178 that is cyclically operated by the controller 89. The exiting channel bars 73 move between guide rails 152 and 179 and contain the assembled capacitors and boxes with the encapsulant in a fully cured state. The attending operator removes the channel bars and places the assembled capacitors and boxes into a suitable container for transfer to another fabricating station, such as a lead frame strip severing station.

During the assembly of the lead frame strip and the boxes, certain of the terminal shoulders may not be snapped into the entries in the boxes 30 or one or more of the capacitors 36 may be missing from the lead frame, in which case an unassembled box or boxes rest in the slots 54. As the operator slides the rack carrier 51 from the assembly station 67, each section of the lead frame containing a feed hole 181 is moved past a blower 182, see FIGS. 1, 12, 13 and 14. The trackway 53 is provided with a slot 183 over which the boxes 30 are moved. If a box 30 is not connected to the lead frame strip 68, the air blower 182 ejects the box through the slot into a drawer hopper 184. It is important to remove the non-connected boxes that are partially filled with encapsulant from the apparatus prior to movement through the oven 80. If these boxes are not removed, the subsequent assembly of the channel stripper bar 73 will result in the tipping of the boxes and the spilling of the encapsulant onto the platform 71.

If the machine is left unattended for a period of time, the advancing rack carriers 51 will eventually move into register with a photodetector 186. The photodetector upon sensing the presence of a rack carrier will generate a signal which is impressed on the controller 89 to control the stopping of the apparatus and the illumination of a light 92 on the panel 91. The illumination of this light will apprise the operator as to the reason that the apparatus stopped.

When the channel bars 73 are moved by the dogs 74 and 76 into the oven, the attending operator may place one or more loaded channel bars 73 in front of the dogs. The subsequent closing of the shield 77 effectuates the operation of the photocell 167 to initiate operation of the air cylinder 163 to air drive the piston rod 162, the block 158 and the dogs 74 and 76 to push the loaded channel bars 73 into the oven 80. The operator may load as many as three channel bars in front of the dogs 74 and 76. When the dogs move forward to advance the channel bars, a photodetector 188 senses the presence of the bars. The air cylinder 163 will drive the dogs 74 and 76 forward and move the channel bars, until the the leading channel bar engages the stack of channel bars already in the oven 80.

The length of the stack of channel bars in the oven limits the stroke of the air cylinder driven piston rod 162. If channel bars are still blocking the photodetector 188, a signal is generated to recycle the operation of the air cylinder 163 so that the dogs 74 and 76 are withdrawn and then subsequently driven forward again by the reoperation of the air cylinder 163. The cyclic operation of the air cylinder 163 is interlocked with the operation of the air cylinder 173 so that the air cylinder 163 does not operate while the air cylinder 173 is pushing the transfer bar 171 through a cycle to transfer a channel bar from the left-hand stack to the right-hand stack in the oven.

Looking at FIG. 2, it will be noted that a photodetector 189 is mounted to sense the transfer bar 171. When the transfer bar 171 is in the withdrawn position, such as shown, the photodetector 189 produces a signal which enables an operation of the air cylinder 163. The cyclic operation of the air cylinder 178 is tied in with the cyclic operation of the air cylinder 173 so that upon completion of each transfer of a channel bar into the right-hand stack position is followed by an operation of the air cylinder 178 to shift the right-hand stack of channel bars in a direction exiting from the oven 80.

The attending operator will periodically remove the exiting channel bars and strip the assembled boxes and capacitors from the bars and place them in a suitable receptacle. If the channel bars are not removed, the exiting stack eventually moves the leading channel bar into register with a photocell 191 which generates a signal to interrupt the cyclic operation of the overall apparatus. This interruption is accompanied by illumination of a light 92 on the display board 91. A buzzer 93 in the display may also be actuated to draw the attention of the attending operator to the accumulation of an excessive amount of channel bars exiting from the oven.

Figure 16B:
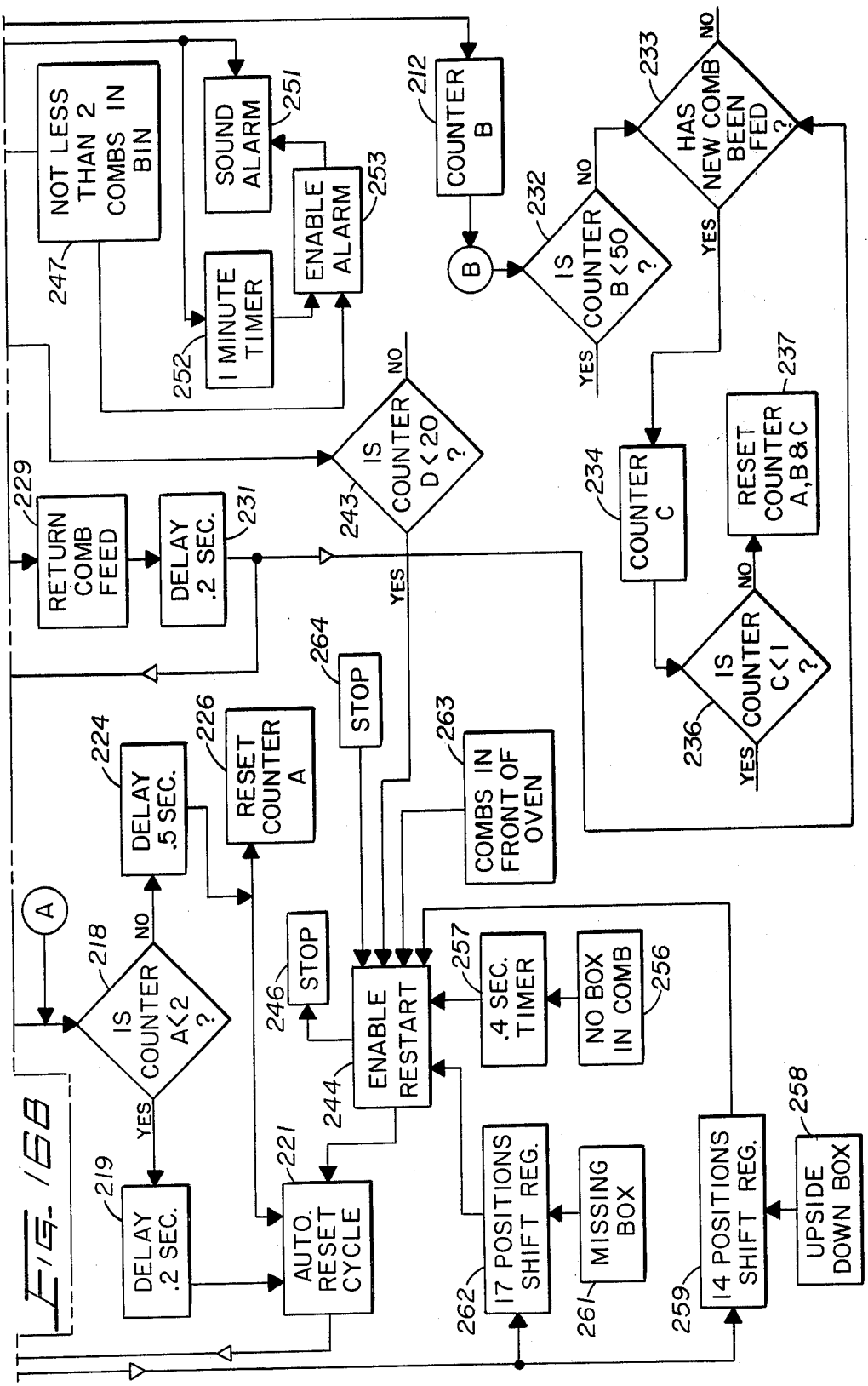
FIG. 16 is an instruction diagram showing how FIGS. 16A and 16B may be assembled to provide a sequence flow chart depicting the various operations of the apparatus and from which a program or other control system can be derived to control the apparatus in accordance with the principles of the invention.

A comprehensive understanding of the functioning of the various component mechanisms and method steps heretofore described may be had by reference to the program logic flow diagram shown in FIGS. 16A and 16B when assembled in the manner depicted in FIG. 16. By following the flow diagram a programmer may write an apparatus control program for any of a number of commercially available computer base or microprocessor systems, such as the aforeidentified Texas Instruments 5TI Programmable Control System which is diagrammatically illustrated in FIG. 17. A microfiche program listing for controlling the overall system in accordance with the flow diagram is filed with this application as an appendix to this specification and is incorporated in the specification by reference.

Considering now a normal fast feed cycle during which time no encapsulant is dispensed into the boxes, depression of a start button (Block 201) initiates the cyclic control by operating the solenoid control air cylinder 116 (Block 202) to move the initially engaged cog devices 59 and 61 toward the right. After a delay of 0.3 of a second (Block 203) which is sufficient to allow the cog shuttle 59-61 to move to the right, the solenoid controlled air cylinder 106 is operated (Block 204) to disengage the cog slide 102. Simultaneous with the disengagement of the right cog slide, the air cylinder 99 associated with the left cog slide 96 is operated (Block 206) to withdraw the cog teeth from the teeth of the rack carrier. Following a delay of 0.2 of a second (Block 207), a signal is generated to operate the solenoid control valve associated with the air cylinder 116 to shift the shuttle including the cog devices 59 and 61 toward the left (Block 208).

After a delay of 0.2 of a second (Block 209) which is sufficient to allow the shuttle to shift to the left, a signal is produced to reoperate the solenoid valve associated with the air cylinder (Block 211) to reengage the teeth on the right-hand cog slide 102 with the teeth on the rack carrier.

Each time the right cog slide 102 is disengaged (Block 204), a signal is impressed on a counter B (Block 212). If counter B registers less than fifty counts, a decision circuit (Block 213) produces an output which is delayed (Block 214) by 0.2 of a second and then applied to the solenoid valve associated with the air cylinder 99 to reengage the left cog slide 96 (Block 216). Following each movement of the shuttle 59-61 to the right, a signal is impressed on a counter A (Block 217). The engagement of the left cog slide 96 is accompanied by impressing a signal on a decision circuit (Block 218). If the counter A has less than two counts registered then the decision circuit 218 produces an output which is delayed 0.2 of a second (Block 219) and applied to an automatic restart cycle circuit (Block 221) which responds to produce an output that is impressed to initiate another feed cycle (Block 202). This is the normal fast feed cycle and no encapsulant is dispensed from the dispenser 63.

If, however, counter A (Block 217) has two counts registered therein then a decision circuit (Block 222) responds to apply a signal to operate the relay circuit 121 to operate valves associated with the nozzles 64 and 66 and a charge of encapsulant is dispensed (Block 223) into the two boxes positioned underneath the nozzles 64 and 66. The encapsulant dispensing cycle is controlled to operate during the slow cycle of the feed of the rack carrier.

More particularly, the slow feed cycle is established by delaying the operation of the air cylinder 116 which controls the movement of the cog devices toward the right. In this instance the operation proceeds as heretofore described with respect to the fast cycle until the signal is applied to the decision circuit (Block 218). In this instance, the counter A has registered a second count and the output of the decision circuit is impressed on a delay (Block 224). After a 0.5 of a second delay, a signal is impressed on the automatic restart circuit (Block 221) to initiate another cycle of operation. During this delay, counter A causes the encapsulant dispenser (Block 223) to exercise a cycle of operation. Following the delay, a reset signal (Block 226) is impressed on counter A (Block 217) so that the next cycle of operation of the cog devices is a fast cycle.

When fifty rack carrier slots have been advanced, the counter B (Block 212) registers fifty counts. During the next feed cycle, the left cog device (Block 206) and the right cog device (Block 204) are disengaged. After the 0.2 of a second delay (Block 207), the shuttle 59–61 is moved to the left (Block 208). The output from the delay (Block 207) is further delayed another 0.2 of a second (Block 209) and the right cog device 61 is reengaged (Block 211). The delayed signal from Block 207 is impressed on the decision circuit (Block 213). In this instance, the counter B (Block 212) registered fifty counts and, as a result, the decision circuit applies an output to operate the solenoid valve associated with the air cylinder 88 (Block 227). Air cylinder 88 is effective to move the slide 82 toward the right to advance a new rack carrier or comb into the position shown in FIGS. 2 and 3 wherein the new rack carrier is designated 51-F.

It will be noted that at this time the left cog device 59 is not engaged because no signal has been received from decision circuit (Block 213). The feed of the new rack carrier is followed by a delay of 1.5 seconds (Block 228), and then the solenoid valve associated with the air cylinder 88 is switched so that the air cylinder returns the slide 82 to the initial position (Block 229). After a delay 0.2 of a second (Block 231), a signal is impressed on the solenoid valve associated with the air cylinder 99 (Block 216) to move the cog slide 96 into engagement with the trailing teeth on the rack carrier 51-L and the forward teeth on the following rack carrier 51-F. Counter A (Block 217) has only a single count registered, thus, decision circuit (Block 218) responds by placing a 0.2 second delayed signal (Block 219) on the automatic reset cycle circuit (Block 221) to reinitiate the next feed cycle (Block 202). This is a fast speed cycle and the dispenser (Block 223) is not operated.

At the time that the right cog is disengaged (Block 204), a count signal is impressed on a counter B (Block 212) which produces an output that is applied to a decision circuit 232. Inasmuch as fifty counts have been registered in counter B, the decision circuit (Block 232) applies an output to a decision circuit (Block 233). When the rack carrier slide 88 is returned (Block 229) and there is a subsequent delay of 0.2 of a second (Block 231), a second input is applied to the decision circuit (Block 233). The appearance of these two signals is indicative of the fact that a new rack carrier has been fed and an output signal is impressed on a counter C (Block 234). The output from counter C is applied to a decision circuit 236 which determines that the counter C is registering its first count and nothing happens.

During the next feed cycle, another count is registered in counter B (Block 212) and decision circuit (Block 232) impresses a signal through decision circuit (Block 233) to register a second count in counter C (Block 234). Decision circuit (Block 236) now places an output signal on a reset counter circuit (Block 237). The reset counter circuit resets the counters A, B and C. Inasmuch as counter A (Block 217) is reset, there is no signal impressed to operate the dispenser (Block 223). When a counter A is reset, decision circuit (Block 218) responds by impressing a 0.2 of a second delayed signal (Block 219) on the automatic reset cycle circuit (Block 221) to conclude another fast feed cycle of the rack carriers.

Counter B (Block 212) is reset so that the feeding cycles proceed along a normal basis that is a fast feed cycle followed by a slow feed cycle, during which time the encapsulant dispenser is operated to flow encapsulant into the pair of aligned boxes 30. Counter C is also reset until such time as the next new rack carrier is fed.

When the photodetector 90 (Block 241) senses that there are less than two rack carriers 51 in the bin 81, a signal is impressed on a counter D (Block 242) which enables the counter to register each operation of the right cog device (Block 204). A decision circuit (Block 243) associated with counter D monitors the counts registered and will produce an output signal when twenty counts are registered in counter D. In this instance, an output is applied from decision circuit (Block 243) to an enable restart circuit (Block 244) which produces an output to stop (Block 246) the functioning of the overall apparatus.

When the attending operator replenishes the supply of rack carriers 51 in the bin 81, the photodetector 90 responds and a signal is generated (Block 247) which is impressed on a timer (Block 248) and after a 0.2 of a second delay, a reset circuit (Block 249) is operated to reset the counter D (Block 242). If the attending operator does not replenish the supply of rack carriers, an alarm (Block 251) is sounded. More particularly, the operation of the photodetector 90 (Block 241) is effective to apply a signal on a one minute timer (Block 252) which operates an enable alarm circuit (Block 253) to produce a signal to operate the conditioned alarm (Block 251). The replenishing of the rack carrier supply causes a signal (Block 247) to be applied to disrupt the enable circuit (Block 253) to cut off the alarm (Block 251).

When the photodetector 131–132 (Block 256) ascertains that a box 30 has not been fed into a slot 54 in the rack carrier, a signal is impressed on a 0.4 second timer (Block 257). After a 0.4 of a second delay, a time period sufficient to allow for the normal seating of a box in the rack carrier slot, a signal is impressed on an enable restart (Block 244) which responds by applying a signal on the stop circuit (Block 246) to interrupt further cyclic operation of the apparatus. The sensing of the missing box is accompanied by illumination of a lamp 92 on the panel 91 to apprise the operator of the situation. Upon full insertion of a box in the slot, the apparatus may be restarted (Block 201).

When the photodetector 136 (Block 258) ascertains that a box is positioned in a slot 54 in an upside down position, a signal is impressed on a shift register 259. Each time the shuttle is moved to the right (Block 202), the signal in the register (Block 259) is shifted one position. After fourteen operations of the shuttle to advance the comb, the upside down box is positioned in alignment with the chute 142 and the valve 139 is operated to impress a pulse of air through the nozzle 138 to eject the upside down box into the curved plate 141 leading to the chute 142. At this time the signal is also impressed on the enable restart (Block 244) to operate the stop (Block 246) to interrupt operation of the apparatus. Again, a lamp 92 is illuminated on the display panel 91 to apprise the operator of the now empty slot in the rack carrier.

As the rack carrier is advanced past the photodetector 134-135 (Block 261) and no box is detected in the carrier slot, a signal is generated and impressed on a shift register (Block 262). Each time the shuttle is moved to the right (Block 202), the signal impressed on the register (Block 262) is shifted one increment. After seventeen operations of the shift register, a signal is generated and impressed on the enable restart (Block 244) to stop (Block 246) the apparatus operation. The attending operator is apprised of the situation by the illumination of a suitable light 92 on the control panel 91 and a box is placed in the missing slot.

If the rack carriers 51 are pushed onto the platform 71 so as to be positioned in front of the photodetector 186 (Block 263), a signal is generated to again operate the enable restart 244 that functions to actuate the stop (Block 246). A light 92 is illuminated on the panel 91 to inform the operator as to the reason for interruption of the cyclic operation of the apparatus. The operator may manually stop the machine by operating a stop button (Block 264) to again energize the enable restart (Block 244) and the stop (Block 246).

The heretofore identified 5TI Programmable Control System is schematically shown in FIG. 17 and may be programmed in accordance with the flow diagram shown in FIGS. 16A and 16B.

More specifically, a program may be entered by means of a keyboard programmer 271 where the actuation of each key stores the appropriate segment of the program in a PROM/READ-WRITE MEMORY 272. The program memory is connected through a logic interface module 273 to an input/output module 274 to control the sequential operation of the component mechanisms of the overall apparatus. Most of the input/output legends are self-explanatory and have been described in detail with respect to the previous descriptions of the logic flow diagram and the specific operations of the apparatus. The X and Y outputs are in accordance with the program.

A pushbutton control 276 is provided to manually reset the various counters prior to the time of start up of the apparatus. In addition, a pushbutton 277 is provided to energize a solenoid 278 that functions to operate facilities for lifting the encapsulating dispenser 63 to permit servicing.

Though the present invention is described with respect to an apparatus for boxing and encapsulating rolled film capacitors, it is believed apparent that the principles of the invention may be used effectively to assemble other types of electrical components, such as resistors, ceramic capacitors and various dual-in-line devices. Moreover, the particular described rack feed carrier device and control may be utilized to advance various components through diverse types of fabricating apparatus.

What is claimed is:

1. A system for encapsulating and boxing capacitors, which comprises:

a trackway;

a stack of carriers positioned at one end of the trackway, each of said carriers having a series of slots for receiving capacitors and including a series of teeth equal in number to the number of slots;

a pair of cog devices coupled together and mounted for movement forward and backward relative to said trackway and each cog device having a slide with a toothed end section mounted for movement toward and away from the trackway to engage the toothed end with the teeth on carriers positioned in said trackway;

means for advancing a succession of carriers from said stack into position to be engaged by the teeth on a first of said cog device slides;

means for operating said cog devices to move said slides (1) forward to advance the tooth engaged carriers, (2) away from said carriers, (3) backward relative to the carriers, and (4) toward said carrier to engage the slide teeth with the carrier teeth;

means for advancing a box into each slot upon each advance of a carrier;

means for injecting a predetermined charge of heat curable encapsulant into each box advanced along the trackway;

means for pressing a strip connected to pairs of terminal leads attached to capacitors to seat the capacitors in the boxes;

an oven for curing the encapsulant;

stripping means for engaging the boxes to shift the boxes and terminal strip from a carrier; and means within the oven for engaging and moving the stripping means through the oven to cure the encapsulant.

2. A system as defined in claim 1, which includes:

means for controlling the movement of the slides to advance the carriers to alternately impose a short delay and then a long delay to the initiation of movement of the slides to advance the carriers in the trackway.

3. A system as defined in claim 1, wherein the means for injecting encapsulant in the boxes includes a pair of nozzles spaced apart a distance equal to the spacing between a pair of box receiving slots in the carrier; and means for controlling the encapsulant injecting means to inject encapsulant during each long delay.

4. A system as defined in claim 1, which includes:

means for sensing the advance of each box into each carrier slot; and means responsive to the sensing means failing to sense the advance of a box for interrupting further operation of the cog devices.

5. A system as defined in claim 1, which includes:

means for sensing the presence of each box advanced by a carrier; and means responsive to said sensing means failing to sense a box in a carrier for interrupting operation of the cog devices after said cog devices execute a predetermined number of cycles of operation.

6. A system as defined in claim 1, which includes:
means for impinging a light beam on each box advanced by the carrier;
means for sensing the reflected light beam to generate a signal when the light beam strikes a box with its bottom side up; and
an air nozzle having a solenoid control energized by said signal for impinging an air jet on the box in the carrier to eject the box.

7. A system as defined in claim 1, wherein the stripping means comprises:
a U-shaped channel bar with an opening of sufficient width and depth to receive the terminal strip and the boxes.

8. A system as defined in claim 7, wherein the oven includes:
guide rails arrange in parallel to provide a pair of guideways for a series of channel bars moving into and out of the oven;
a pair of spring-loaded dogs for engaging the channel bars;
means for cyclically operating the dogs to move the channel bars along a first of said guideways into the oven;
means for shifting each advanced channel bar into the second of said guideways; and
means rendered effective following each operation of the shifting means to move the shifted channel bars along the second guideway.

9. A system as defined in claim 8, which includes:
means for sensing an accumulation of channel bars being exited from the oven through the second guideway; and
means operated by the sensing means sensing the accumulation for a predetermined time to interrupt operation of the dogs.

10. A method of encapsulating and boxing capacitors, which includes:
advancing a rack carrier from a stack of carriers along a path, said rack carrier having a series of box receiving slots formed along one edge and a series of teeth formed along an opposite edge;
cyclically moving a pair of toothed members from an initial position to (1) engage the teeth on an advanced rack carrier, (2) move the toothed members to the rack carrier further along the path, (3) withdraw the toothed members from the rack carrier, and (4) return the toothed members to the initial position;
feeding a box into each rack carrier slot advanced by the pair of toothed members;
injecting a predetermined charge of heat curable encapsulant into each advanced box;
assembling over the boxes in a rack carrier a strip having pairs of terminal leads connected to individual capacitors with the capacitors individually positioned in each box;
pressing the strip to seat the capacitors in the boxes;
engaging and shifting the strips of boxed capacitors laterally out of the rack carrier to strip the boxes from the rack carrier slots; and
moving the shifted boxed capacitors through an oven to cure the encapsulant.

11. A method as defined in claim 10, which comprises:
holding a first of said toothed members in engagement with a rack carrier while delaying movement of the second toothed member toward the path during advance of a rack carrier from the stack into position to be engaged by the second of the toothed members, and then
moving the second toothed member to engage the teeth on the newly advanced rack carrier, whereafter the cyclic movement of the toothed members is recommenced to feed the newly advanced rack carrier.

12. A method as defined in claim 10, which includes:
alternately delaying the movement of the toothed members to advance the rack carrier for short and then long periods; and
injecting the encapsulant in the boxes during the long periods of delay in the movement of the toothed members.

13. A method as defined in claim 12, wherein the injecting step comprises:
injecting encapsulant into a pair of boxes during each long delay in the movement of the toothed members.

14. A method as defined in claim 10, which comprises:
sensing the presence of each box advanced into each rack carrier slot; and
interrupting the cyclic operation of the toothed members upon failing to sense the presence of a box in a slot.

* * * * *